United States Patent [19]

Barthell et al.

[11] Patent Number: 4,663,491

[45] Date of Patent: May 5, 1987

[54] COPOLYMERS OF N-ALKYL ACRYLATES AND MALEIC ANHYDRIDE AND THEIR USE AS CRYSTALLIZATION INHIBITORS FOR PARAFFIN-BEARING CRUDE OILS

[75] Inventors: Eduard Barthell, Deutschland; Anthony Capelle, Niederlande; Miroslav Chmelir, Deutschland; Kurt Dahmen, Deutschland, all of Fed. Rep. of Germany

[73] Assignee: Chemische Fabrik Stockhausen GmbH, Krefeld, Fed. Rep. of Germany

[21] Appl. No.: 741,043

[22] Filed: Jun. 4, 1985

Related U.S. Application Data

[60] Continuation of Ser. No. 444,021, Nov. 23, 1982, abandoned, which is a division of Ser. No. 292,557, Aug. 13, 1981, abandoned.

[30] Foreign Application Priority Data

Aug. 23, 1980 [DE] Fed. Rep. of Germany ....... 3031900

[51] Int. Cl.$^4$ .......................... C07C 7/20; C10L 1/18

[52] U.S. Cl. ........................................... 585/3; 585/1; 585/2; 252/56 D; 526/271

[58] Field of Search ................. 585/3, 2, 1; 252/56 D; 526/271

[56] References Cited

U.S. PATENT DOCUMENTS

| | | | |
|---|---|---|---|
| 2,580,053 | 12/1951 | Tutwiler et al. | 252/56 D |
| 2,600,422 | 6/1952 | Neher et al. | 252/56 D |
| 2,600,449 | 6/1952 | Van Horne et al. | 252/56 D |
| 2,642,414 | 6/1953 | Bauer et al. | 252/56 D |
| 3,087,893 | 4/1963 | Agius et al. | 252/56 D |
| 3,853,497 | 12/1974 | Miller et al. | 585/10 |

Primary Examiner—Asok Pal
Attorney, Agent, or Firm—Sprung, Horn, Kramer & Woods

[57] ABSTRACT

The invention relates to copolymers of esters of acrylic acid or methacrylic acid with unbranched alcohols that contain at least 16 C atoms, and maleic anhydride, and also the use of these copolymers as crystallization inhibitors in paraffin-bearing crude oils.

7 Claims, No Drawings

COPOLYMERS OF N-ALKYL ACRYLATES AND MALEIC ANHYDRIDE AND THEIR USE AS CRYSTALLIZATION INHIBITORS FOR PARAFFIN-BEARING CRUDE OILS

This is a continuation of application Ser. No. 444,021, filed Nov. 23, 1982, now abandoned, which is a division of application Ser. No. 292,557, filed Aug. 13, 1981, now abandoned.

The invention relates to copolymers of n-alkyl acrylates and maleic anhydride and also their use as crystallization inhibitors for paraffin-bearing crude oils.

Crude oils may contain considerable amounts of paraffin depending on the particular crude oil extraction field. When the crude oils are cooled to below a certain temperature, the paraffin crystallizes out and in so doing forms a three-dimensional network of flakes and/or needles that is filled with oil. Such a structure imparts disadvantageous properties to the crude oil with regard to its flowability and handling ability.

As a result of the crystallized form of the paraffin in the crude oil, the oil does not flow at all, or only slightly, it cannot be pumped at all, or only with extreme difficulty, and it forms deposits in pipework and pipelines, in storage containers or in ships' tanks, which lead to considerable losses in production and capacity.

It can be seen from this that the flow properties of the crude oil are very important both during extraction and storage, and during transport and, indeed, even during refining, and that the effects that impair the flowability must be counteracted.

The crude oils present in oil-bearing layers experience a temperature that varies with depth. In the deeper layers from which the oil is extracted, higher temperatures prevail at which the paraffin is still in liquid form and is dissolved in the crude oil. If crystallization inhibitors are added to a paraffin-bearing crude oil in this state, this gives rise, on the one hand, to a lowering of the pourpoint of the crude oil. On the other hand, as a result of the addition of crystallization inhibitors, the crystal structure of the separated wax is changed in such a manner that the flow properties of the oil are improved.

The crystallization inhibitors are usually polymers that have been manufactured by polymerizing olefinically unsaturated compounds of which at least some contain an unbranched saturated hydrocarbon chain having at least 18 C atoms. Such products are described, for example, in DAS 2 210 431
DOS 2 612 757
DOS 2 264 328
DOS 2 062 023
DOS 2 330 232
DOS 1 942 504
DOS 2 047 448
DOS 2 413 439

It has been found in practice, however, that many known products entail disadvantages. It has, for example, been found that many products cannot be applied universally to all oil sources and that in different oils they lose their effect.

A further disadvantage of many products is their high sensitivity to shearing forces. It has been found in practice that many known products fulfil their function as crystallization inhibitors for paraffin-bearing crude oils only when the treated oils are not subjected to any shearing stress. Crude oils are normally, however, transported in pipelines, the transport being effected by pumping. In so doing, the shearing forces exerted by the pumps completely destroy the effect of many crystallization inhibitors.

The problem underlying the invention was therefore to provide crystallization inhibitors that give rise to a distinct lowering of the pourpoint in a great number of paraffin-bearing oil sources, as well as lowering the pourpoint, also give rise to a reduction in paraffin deposition, reduce the viscosity of the crude oil and retain their effectiveness under shearing stress (pumping).

The problem is solved by crystallization inhibitors that consist of a copolymer of n-alkyl acrylates and maleic anhydride or that contain such copolymers.

The subject of the invention is therefore copolymers of n-alkyl acrylates of the general formula

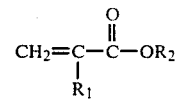     A and maleic anhydride of the formula

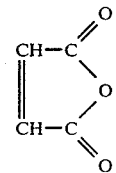     B in which:

$R_1$ represents hydrogen or methyl and $R_2$ represents an n-alkyl radical having at least 16, preferably from 16 to 30, C atoms.

The molar ratio of n-alkyl acrylates (A) to maleic anhydride is, in general, from 20:1 to 1:10, preferably from 8:1 to 1:5 and especially from 4:1 to 1:1.

The intrinsic viscosity of the copolymer is from 8 to 100 ml/g, preferably from 10 to 50 ml/g, measured in toluene at 20° C.

Compounds of the formula A are esters of acrylic acid or methacrylic acid with unbranched alcohols that contain at least 16 C atoms. The upper limit for the number of C atoms is not critical. It depends on the commercial availability of the alcohols. Such alcohols may be of natural or synthetic origin. In general, they are alcohol mixtures having a wide distribution of C-chains. The radical $R_2$ therefore represents the mean chain length which is derived from the distribution of C-chains in the alcohol mixture. $R_2$ lies, preferably, within a range of from 20 to 22 C atoms.

The distribution of C-chains in the alcohol mixture should correspond approximately to the following composition:

| | | |
|---|---|---|
| max. | 45% by weight | $C_{16}$–$C_{18}$ |
| | 50–90% by weight | $C_{20}$–$C_{22}$ |
| | 5–20% by weight | $C_{24}$–$C_{26}$ |
| max. | 10% by weight | $C_{28}$ and higher. |

Certain fractions of the synthetic alcohols obtained by the Ziegler synthesis have proved to be especially suitable, a preferred section having the following composition:

| max. | 7% by weight | $C_{18}$ |
| --- | --- | --- |
| | 55–67% by weight | $C_{20}$ |
| | 23–31% by weight | $C_{22}$ |
| approx. | 10% by weight | $C_{24}$ and higher. |

As a result of their synthetic method of manufacture, the alcohols may still contain a small percentage of neutral portions, for example paraffin, which does not, however, interfere with the properties of the products according to the invention.

The monomeric esters are manufactured from the alcohols and the acrylic acid or methacrylic acid in a conventional and known manner, for example by heating the alcohol mixture with acrylic acid or methacrylic acid in the presence of an esterification catalyst, such as, for example, sulphuric acid or p-toluenesulphonic acid, and a polymerization inhibitor, such as, for example, hydroquinone, advantageously in the presence of an azeotropic solvent, such as, for example, benzene, toluene or xylene, until the reaction water has been removed. The esterification is carried out at a temperature of between 70° and 170° C., depending on the solvent used.

The copolymers are manufactured by copolymerizing the monomers denoted by the formulae A and B. The polymerization may be carried out according to known processes, either without solvents (mass polymerization) or in organic solvents in which the monomers and the copolymer are soluble and that are inert with respect to maleic anhydride. With this method the polymer is obtained either in solid form or as a solution. The solvent must be inert with respect to the monomers and the copolymer. An aromatic or aliphatic hydrocarbon is preferably used, but it is also possible to use any other solvent that is inert with respect to maleic anhydride, and also commercial solvent mixtures that meet the requirements given above. Suitable solvents include, for example, benzene, toluene, liquid paraffins, chlorinated hydrocarbons (for example trichloroethane, tetrachloroethylene) etc. Preferred solvents are toluene or a solvent mixture that contains aromatic compounds and has the following composition:

| % by volume of saturated hydrocarbons: | 0.1 |
| --- | --- |
| % by volume of olefins: | 0.2 |
| % by volume of aromatic compounds: | 99.7 |
| which consist of: | |
| % by volume of alkylbenzenes having $C_9$: | 9.9 |
| % by volume of alkylbenzenes having $C_{10}$: | 78.5 |
| % by volume of alkylbenzenes having $C_{11}$: | 6.3 |
| % by volume of monocycloalkylbenzene having $C_{10}$: | 3.2 |
| % by volume of naphthalenes | 1.8 |

The monomer concentration in the solvent is from 20 to 100% by weight, preferably from 50 to 100%, so that, after polymerization, a wax-like product or a solution is usually obtained. Although when the monomer concentration is high the reaction is strongly exothermic, the reaction speed, on the other hand, is not especially high, so that monitoring of the polymerization process can be maintained without any difficulty.

The polymerization can be carried out within a temperature range of from 50° to 150° C., the preferred temperatures lying within a range of from 80° to 120° C.

According to the process of the invention, the reaction time at from 85° to 95° C. is approximately 4 hours.

An organosoluble radical-forming catalyst is necessary for the polymerization. Suitable catalysts include benzoyl peroxide, caprylyl peroxide, acetyl peroxide, acetyl benzoyl peroxide, di-tert-butyl peroxide, azoisobutyronitrile, dimethyl azoisobutyrate and many others. Mixtures of such catalysts are also suitable in the polymerization process of the present invention.

The copolymers according to the invention are wax-like, solid products, which dissolve readily in organic solvents, for example toluene, but dissolve somewhat more slowly in lubricating oils and in crude oils. It is therefore advantageous with regard to the use of the products to manufacture them directly in solution or, in the case of mass polymerization, to manufacture the solution directly after the copolymerization by mixing the fused copolymer with a suitable solvent, so that the finished products are in the form of a solution or a dispersion.

If the copolymer is dissolved in, or diluted with, water-containing solvents, or if the copolymer is optionally made up in the form of a water-in-oil or oil-in-water emulsion, the anhydride bond is partially or completely split to give the free acid, so that, as a result, a copolymer of n-alkyl acrylate and maleic acid or a terpolymer of n-alkyl acrylate, maleic anhydride and maleic acid is formed. The same copolymer of n-alkyl acrylate and maleic acid is also obtained if the copolymer of n-alkyl acrylate and maleic anhydride is treated with the equivalent amount of water or steam corresponding to the maleic anhydride portion. For their use according to the invention as crystallization inhibitors, the copolymers may be used both in the anhydride form and in the acid form.

The degree of polymerization, which is important for the characterization of the copolymer, cannot be determined directly because the constants of the Mark Houwink relationship are not yet known for such copolymers. The only remaining possibility is therefore to draw conclusions about the relative degree of polymerization from the intrinsic viscosity (in toluene at 20° C.) determined according to the conventional method. The intrinsic viscosity of the copolymer is from 8 to 100 ml/g depending on the manufacturing conditions, the preferred intrinsic viscosity being from 10 to 50 ml/g.

The use of the crystallization inhibitors according to the invention for lowering the pourpoint and preventing paraffin deposition in paraffin-bearing crude oils is also a subject of the invention.

The concentration at which the crystallization inhibitors according to the invention are to be used varies from one crude oil to another and should be established for the particular type of oil by determining the pourpoint and by deposition tests.

In general, the concentrations at which the crystallization inhibitors according to the invention are to be used lie between 20 and 1000 ppm, concentrations of from 50 to 35 ppm being preferred. The crystallization inhibitors according to the invention are, preferably, added actually in the well.

The pourpoint is determined, in general, according to ASTM-D 97 B section 6 f, four different types of pourpoint determination being distinguished.
(a) The actual pourpoint
(b) The minimum pourpoint
(c) The maximum pourpoint
(d) The "true" maximum pourpoint.

The effectiveness of the crystallization inhibitors according to the invention against paraffin deposits is tested according to a method developed by the firm SERVO which is described in the Company brochure "Servo paraffin inhibitors for paraffin deposit prevention" SERVO BV, Delden/Netherlands. According to this method a paraffin-bearing crude oil is conditioned in an insulated vessel to a temperature $T_o$. Two metal discs in a holder are then cooled to a temperature $T_c$ while they are immersed in the oil. By simultaneously lowering the temperatures $T_o$ and $T_c$ in a gradual manner, a rapid simulation of the practical conditions is obtained. The paraffin deposit is determined by weighing the metal discs, and the reduction in deposit can be calculated as a percentage by comparing the results with those of a blank test in which no crystallization inhibitors are added.

The manufacture of the monomeric and polymeric products and also the use thereof is described in the following examples:

EXAMPLE 1

Composition and properties of the starting alcohols:

The alcohols A and B represent synthetic, primary, straight-chained alcohols that were obtained according to the Ziegler process (Alfols (R)), whereas alcohol C is a product based on plant and animal oils and fats.

|  | Alcohol A | Alcohol B | Alcohol C |
|---|---|---|---|
| C-chain distribution % by weight |  |  |  |
| $C_{16}$ | 0.5 | — | 1.0 |
| $C_{18}$ | 2.5 | 1.5 | 47.0 |
| $C_{20}$ | 58.0 | 49.0 | 11.0 |
| $C_{22}$ | 28.0 | 28.0 | 40.0 |
| $C_{24}$ | 2.5 | 11.0 | 1.0 |
| $C_{26}$ | 7.5 | 3.0 | — |
| $C_{28}$ and higher | 1.0 | 7.5 | — |
| Alcohol content % by weight | approx. 85 | approx. 80 | approx. 90 |
| Hydroxyl No. | 168 | 152 | 194 |

The following materials were used for the synthesis of the monomeric alkyl acrylates:

| alcohol A: | 1003 g (3 mol) |
|---|---|
| alcohol B: | 1107 g (3 mol) |
| alcohol C: | 867 g (3 mol) |
| toluene: | 804 g |
| acrylic acid: | 216 g (3 mol) |
| hydroquinone: | 3 g |
| sulphuric acid: | 3 g |

The alcohol component was dissolved in toluene while heating to approximately 60° C. After the addition of hydroquinone and acrylic acid, the esterification was catalyzed with sulphuric acid. The reaction mixture was heated to reflux and the reaction water was separated off azeotropically. Approximately 98% of the theoretical amount of water were removed in 6 hours. The solvent and the unreacted acrylic acid were then removed from the reaction mixture by vacuum distillation. The monomeric acrylic acid esters has the following characteristics:

|  | Acrylic acid esters | | |
|---|---|---|---|
| Analytical data | A | B | C |
| Appearance: | brown paste | brown paste | brown paste |
| Acid No.: | 2 | 1 | 2 |
| Saponification No.: | 130 | 142 | 160 |
| Ester No.: | 128 | 141 | 158 |

EXAMPLE 2

95.4 g of acrylic acid ester A and 24.5 g of maleic anhydride in a molar ratio of 1:1 were placed in a polymerization vessel and heated to 85° C. in a nitrogen atmosphere. At that temperature, 0.15 g of azoisobutyronitrile (AIBN) in 3 ml of toluene was added. The temperature rose to 100° C. in the course of 10 minutes. After cooling to 95° C., further amounts of the catalyst were added in several metered portions for as long as an exothermic reaction could be observed. In total, 0.75 g of AIBN, dissolved in 15 ml of toluene, was consumed. The reaction time was 4 hours and the polymerization temperature was from 85° to 100° C.

The application technology properties of the copolymer can be seen in Tables 1, 2 and 4.

EXAMPLE 3

66 g of the acrylic acid ester/maleic anhydride copolymer manufactured in Example 2 were heated to 85° C. in a stirrer vessel and 2.3 g of water were added. In so doing the reaction temperature rose to 98° C. The resulting product (acrylic acid ester maleic acid copolymer) was then diluted with 103 g of toluene and 21 g of isopropanol. The application technology properties of the copolymer can be seen in Tables 1, 2 and 4.

EXAMPLE 4

105.3 g of acrylic acid ester B and 21.9 g of maleic anhydride in the molar ratio 1:1 were placed in a polymerization vessel and heated to 82° C. in a nitrogen atmosphere. The polymerization was initiated with the addition of 0.15 g of AIBN in 3.0 ml of toluene. In the course of the first 25 minutes, the temperature rose to 93° C. For as long as an exothermic reaction could be detected, initiator solution was added in several metered portions (in total 1.35 of AIBN). The overall reaction time was 4 hours. The polymerization temperature was from 85° to 98° C. The application technology properties of the copolymer can be seen in Tables 1 and 2.

EXAMPLE 5

According to the process described in Examples 2 and 4, the copolymerization of the acrylic acid ester A with maleic anhydride was carried out in different molar ratios:

|  | Acrylic acid ester/maleic anhydride | Intrinsic Viscosity |
|---|---|---|
| Polymer C | 2:1 | 20.9 |
| Polymer D | 2:1 | 8.4* |
| Polymer E | 4:1 | 50.0 |
| Polymer F | 4:1 | 27.7* |
| Polymer G | 8:1 | 46.1 |

*0.7% by weight of dodecyl mercaptan was used as a polymerization regulator.

The effect of the products can be seen in Tables 1, 2, 3 and 5.

EXAMPLE 6

188 g of acrylic acid ester A and 98.1 g of maleic anhydride in the molar ratio 1:2 were placed in a polymerization vessel and heated to 90° C. in a nitrogen atmosphere. The polymerization was then started with the addition of 0.1 g of AIBN in 2 ml of toluene. For as long as an exothermic reaction could be detected, initiator solution was added in several metered portions (in total 1.65 g of AIBN in 33 ml of toluene). The polymerization temperature was from 90° to 100° C. during a reaction time of 4 hours.

TABLE 1

Pourpoint in °C. of Ahrensheide crude oil at indicated concentration of crystallization inhibitor

| Product according to | 0 ppm | 25 ppm | 50 ppm | 75 ppm |
|---|---|---|---|---|
| Example 2 | 18 | | 12 | |
| Example 3 | 18 | | 12 | |
| Example 4 | 18 | | 9 | |
| Example 5, polymer C | 18 | 12 | 6 | −3 |
| Example 5, polymer D | 18 | 12 | 3 | −6 |
| Example 5, polymer E | 18 | −3 | −12 | −15 |
| Example 5, polymer F | 18 | | −3 | −6 |
| Example 5, polymer G | 18 | 3 | | −12 |

TABLE 2

Pourpoint in °C. of India crude oil at indicated concentration of crystallization inhibitor

| Product according to | 0 ppm | 80 ppm | 160 ppm | 240 ppm | 320 ppm |
|---|---|---|---|---|---|
| Example 2 | 33 | 30 | 24 | 21 | 18 |
| Example 3 | 33 | 30 | 30 | 24 | 21 |
| Example 4 | 33 | 30 | 24 | 24 | 21 |
| Example 5, polymer C | 33 | 24 | 24 | 15 | 12 |
| Example 5, polymer D | 33 | 30 | 24 | 15 | 12 |
| Example 5, polymer E | 33 | 24 | 15 | 12 | 12 |
| Example 5, polymer F | 33 | 21 | 15 | 15 | 12 |
| Example 5, polymer G | 33 | 27 | 18 | 18 | 15 |

TABLE 3

Pourpoint in °C. of Schledehausen crude oil at indicated concentration of crystallization inhibitor.

| Product according to | 0 ppm | 20 ppm | 40 ppm | 50 ppm | 60 ppm | 80 ppm | 110 ppm | 200 ppm |
|---|---|---|---|---|---|---|---|---|
| Example 5, polymer C | 15 | 15 | 15 | 12 | 9 | 9 | 3 | −15 |
| Example 5, polymer D | 15 | 15 | 15 | 12 | 9 | 6 | 3 | −15 |
| Example 5, polymer E | 15 | 15 | 12 | 9 | 3 | 0 | −6 | −9 |
| Example 5, polymer F | 15 | 9 | 3 | −9 | −15 | −15 | −15 | −15 |
| Example 5, polymer G | 15 | 12 | 9 | 6 | −3 | −6 | −9 | −15 |

TABLE 4

Pourpoint in °C. of Ortland crude oil at indicated concentration of crystallization inhibitor.

| Product according to | 0 ppm | 40 ppm | 80 ppm | 160 ppm | 240 ppm | 320 ppm |
|---|---|---|---|---|---|---|
| Example 2 | 18 | 18 | 18 | 12 | 0 | −6 |
| Example 3 | 18 | — | 18 | 12 | 6 | 0 |

TABLE 5

% reduction in paraffin deposit by means of the crystallization inhibitors according to the invention, measured in a synthetic, paraffin-bearing oil of the following composition:

| 7.5% by weight of paraffin having the distribution of C-chains: | | | |
|---|---|---|---|
| $C_{19}$ | 0.5% | $C_{29}$ | 7.1% |
| $C_{20}$ | 2.1% | $C_{30}$ | 6.0% |
| $C_{21}$ | 4.2% | $C_{31}$ | 4.5% |
| $C_{22}$ | 8.0% | $C_{32}$ | 3.5% |
| $C_{23}$ | 9.6% | $C_{33}$ | 2.3% |
| $C_{24}$ | 10.7% | $C_{34}$ | 1.5% |
| $C_{25}$ | 9.5% | $C_{35}$ | 1.1% |
| $C_{26}$ | 9.2% | $C_{36}$ | 0.5% |
| $C_{27}$ | 8.3% | $C_{37}$ | 0.3% |
| $C_{28}$ | 8.2% | $C_{38}$ | 0.2% |
| | | $C_{39}$ | 0.1% |

92.5% by weight of a fraction of petroleum of the boiling range 161–197° C. and further characteristic data:

| Density: | 0.78 |
|---|---|
| Refractive index: | 1.4357 (20° C.) |
| Viscosity: | 1.14 cs (at 25° C.) |

| Product according to | 40 ppm | 60 ppm | 80 ppm |
|---|---|---|---|
| Example 5, polymer C | 16.3 | 35.1 | 48.1% |
| Example 5, polymer D | 15.9 | 25.2 | 42.6% |
| Example 5, polymer E | 15.5 | 27.1 | 43.0% |
| Example 5, polymer F | 16.7 | 31.8 | 35.5% |
| Example 5, polymer G | 18.5 | 34.9 | 46.8% |
| without the addition of product. | 0 | 0 | 0 |

TABLE 6

Properties of the crude oils used in Examples 1 to 6:

| | Ahrensheider Crude | India Crude | Schledehausen Crude | Ortland Crude |
|---|---|---|---|---|
| Density (g/cm) | 0.87 | 0.83–0.84 | 0.89 | 0.87 |
| Viscosity cs | 41.3 at 20° C. | 6.5/at 30° C. 4.0/at 40° C. | 206.3/ at 20° C. | 33.8/ at 20° C. |
| Pourpoint (°C.) | 18 | 33 | 15 | 15 |
| Paraffin content (%) | 5.1 | 15 | 8.3 | 5.8 |
| Asphaltenes (%) | — | 0.05 | — | max. 1 |

It will be appreciated that the instant specification and examples are set forth by way of illustration and not limitation, and that various modifications and changes may be made without departing from the spirit and scope of the present invention.

What is claimed is:

1. In the inhibition of the crystallization of oil by the addition thereof of a crystallization inhibitor, the improvement which comprises employing as said inhibitor a copolymer consisting of units of an n-alkyl acrylate of the formula

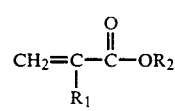

in which $R_1$ is hydrogen or methyl, and $R_2$ is an n-alkyl radical having at least 16 C atoms, and maleic anhydride, the copolymer having been produced by radical polymerization of the monomers and having a molar ratio of n-alkyl acrylate:maleic anhydride from about 1:1 to 19:1 and an intrinsic viscosity within a range of about 8 to 100 ml/g, the copolymer being added as a solution or dispersion in a solvent in an amount such that it is present in about 20 to 1000 ppm of oil.

2. The process according to claim 1, wherein the oil is a paraffinic crude oil.

3. The process according to claim 1, wherein the copolymer is added in an amount such that it is present in about 50 to 350 ppm of oil.

4. The process according to claim 1, wherein the copolymer has an intrinsic viscosity within a range of about 10 to 50 ml/g.

5. Oil containing as a crystallization inhibitor about 20 to 1000 ppm of a copolymer consisting of units of an n-alkyl acrylate of the formula

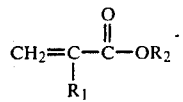

in which $R_1$ is hydrogen or methyl, and $R_2$ is an n-alkyl radical having at least 16 C atoms, and maleic anhydride, wherein the molar ratio of n-alkyl acrylate:maleic anhydride is from about 1:1 to 19:1.

6. Paraffinic oil according to claim 5 containing about 50 to 350 ppm of copolymer as crystallization inhibitor, the copolymer having been produced by radical polymerization of the monomers and having a molar ratio of n-alkyl acrylate:maleic anhydride from about 1:1 to 19:1 and an intrinsic viscosity within a range of about 8 to 100 ml/g.

7. Paraffinic oil according to claim 6, wherein the copolymer has an intrinsic viscosity within a range of about 10 to 50 ml/g.

* * * * *

UNITED STATES PATENT AND TRADEMARK OFFICE
CERTIFICATE OF CORRECTION

PATENT NO. : 4,663,491
DATED : May 5, 1987
INVENTOR(S) : Eduard Barthell, et al

It is certified that error appears in the above-identified patent and that said Letters Patent is hereby corrected as shown below:

Column 4, line 59, "35" should read -- 350 --.

Signed and Sealed this

Eighth Day of December, 1987

*Attest:*

DONALD J. QUIGG

*Attesting Officer*  *Commissioner of Patents and Trademarks*